United States Patent
Bohn et al.

(10) Patent No.: US 10,951,002 B1
(45) Date of Patent: Mar. 16, 2021

(54) BICHROMATIC LASER FOR QUANTUM COMPUTING APPLICATIONS

(71) Applicant: Honeywell International Inc., Morris Plains, NJ (US)

(72) Inventors: Matthew Bohn, Morris Plains, NJ (US); Matthew Swallows, Morris Plains, NJ (US); Patricia Lee, Morris Plains, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/702,896

(22) Filed: Dec. 4, 2019

(51) Int. Cl.
  *H01S 3/13* (2006.01)
  *H01S 3/23* (2006.01)
  *G06N 10/00* (2019.01)
  *H01S 3/109* (2006.01)
  *H01S 3/10* (2006.01)
  *H01S 3/08* (2006.01)
  *H01S 3/00* (2006.01)

(52) U.S. Cl.
  CPC ........... *H01S 3/2308* (2013.01); *G06N 10/00* (2019.01); *H01S 3/0071* (2013.01); *H01S 3/0078* (2013.01); *H01S 3/0085* (2013.01); *H01S 3/0809* (2013.01); *H01S 3/08018* (2013.01); *H01S 3/08036* (2013.01); *H01S 3/109* (2013.01); *H01S 3/10015* (2013.01); *H01S 3/10084* (2013.01); *H01S 3/1306* (2013.01)

(58) Field of Classification Search
  CPC ............... H01S 3/08036; H01S 3/0809; H01S 3/10015; H01S 3/109; H01S 3/0085; H01S 3/2308; H01S 3/10084; H01S 3/0071; H01S 3/0078; H01S 3/08018; H01S 3/1306
  See application file for complete search history.

(56) References Cited

U.S. PATENT DOCUMENTS

| | | | | |
|---|---|---|---|---|
| 5,148,122 | A * | 9/1992 | Karlquist | H03L 7/26 331/3 |
| 9,680,287 | B2 * | 6/2017 | Schilt | H01S 3/1307 |
| 2013/0100973 | A1 * | 4/2013 | Bondu | H01S 3/1392 372/28 |
| 2015/0263482 | A1 * | 9/2015 | Holczer | H01S 3/1303 372/20 |
| 2018/0048113 | A1 * | 2/2018 | Fermann | H01S 3/0085 |
| 2019/0278155 | A1 * | 9/2019 | Plascak | G02F 1/353 |
| 2019/0312405 | A1 * | 10/2019 | Alouini | H01S 5/0656 |
| 2020/0076149 | A1 * | 3/2020 | Papp | H01S 3/0057 |
| 2020/0295525 | A1 * | 9/2020 | Maker | H01S 3/1394 |

* cited by examiner

Primary Examiner — Kinam Park
(74) Attorney, Agent, or Firm — Alston & Bird LLP (57) ABSTRACT

A multi-frequency laser system comprises a master oscillator to generate a master beam and an arm splitter to split the master beam into a first beam and a second beam. The first beam is provided to a primary mode arm for generation of a primary mode beam and the second beam is provided to a sideband mode arm for generation of a sideband mode beam. The sideband beam arm comprises a modulator to modulate the second beam to generate a beam comprising sidebands; a filter to select a particular sideband mode from the beam comprising sidebands; an amplifier cavity to amplify the particular sideband mode and suppress other residual modes; and an acousto-optical modulator to shift the frequency of each mode of an amplified selected sideband beam to generate a sideband mode beam. The primary and sideband mode beams are provided in a coordinated manner to enact a quantum gate.

20 Claims, 6 Drawing Sheets

BICHROMATIC LASER FOR QUANTUM COMPUTING APPLICATIONS

TECHNICAL FIELD

Various embodiments relate to a bichromatic laser system. Various embodiments relate to a bichromatic laser system with phase control features.

BACKGROUND

In various atomic systems, it is important to be able to deliver laser beams to the system at particular frequencies and/or groups of laser beams having particular frequency separations and/or phase relationships to the atomic system. For example, trapped ion quantum computing uses laser beams to complete various functions within the trapped ion quantum computer. For example, the logic gates of the quantum computer may be implemented using laser beams. Such applications require that the lasers are delivered to the ion trap precisely and accurately in terms of position, frequency, and phase.

BRIEF SUMMARY OF EXAMPLE EMBODIMENTS

Example embodiments provide bichromatic laser systems, corresponding servo systems, and corresponding methods. In various embodiments, the bichromatic laser systems and/or corresponding servo systems are used to perform quantum gates in a quantum computer.

According to one aspect, a multi-frequency laser system is provided. In an example embodiment, the multi-frequency laser system comprises a master oscillator configured to generate a master beam and an arm splitter configured to split the master beam into a first beam and a second beam. The first beam is provided to a primary mode arm for generation of a primary mode beam and the second beam is provided to a sideband mode arm for generation of a sideband mode beam. The multi-laser frequency system further comprises the sideband beam arm, which comprises a modulator configured to modulate the second beam to generate a beam comprising sidebands; a filter configured to select a particular sideband mode from the beam comprising sidebands to generate a selected sideband beam; an amplifier cavity configured to amplify the particular sideband mode and suppress other residual modes of the selected sideband mode; and an acousto-optical modulator configured to shift the frequency of each mode of an amplified selected sideband beam to generate a sideband mode beam. The primary mode beam and sideband mode beam are provided in a coordinated manner to one or more atomic objects to enact a quantum gate.

In an example embodiment, the filter is an etalon. In an example embodiment, the etalon is maintained at a constant temperature by a temperature controlled oven. In an example embodiment, the primary mode arm and the sideband mode arm each comprise a set of nonlinear optical elements. In an example embodiment, the set of nonlinear optical elements comprises a second harmonics generation cavity. In an example embodiment, when the primary mode beam and the sideband mode beam are provided as non-copropagating beams, the primary mode beam and the sideband mode beam are phase-locked to a local oscillator via actuation of a double-pass acousto-optical modulator. In an example embodiment, the double-pass acousto-optical modulator is located in an optical path of the primary mode arm and an optical path of the sideband mode arm upstream of the set of nonlinear optical elements. In an example embodiment, a relative difference between the frequency of the primary mode beam and the sideband mode beam is measured downstream of the set of nonlinear optical elements. In an example embodiment, the system further comprises an acousto-optical modulator located upstream of the set of nonlinear optical elements of the primary mode arm and the set of nonlinear optical elements of the sideband mode arm configured to phase lock the primary mode beam and the sideband mode beam based on a measurement of the relative difference. In an example embodiment, the relative energy difference between the primary mode beam and the sideband mode beam is determined based on an energy difference between two states of a qubit space defined for a quantum computer comprising the multi-frequency laser system. In an example embodiment, when the primary mode beam and the sideband mode beam are copropagating beams, a relative phase difference between the primary mode beam and the sideband mode beam is stabilized using a radio frequency oscillator. In an example embodiment, the system further comprises a servo system configured to stabilize a relative phase difference and/or a relative frequency difference between the primary mode beam and the sideband mode beam. In an example embodiment, the servo system receives as input at least one local oscillator signal and a direct digital synthesizer (DDS) signal. In an example embodiment, the DDS signal is provided as part of an input arm of the servo system and provided to an output arm of the servo system. In an example embodiment, the DDS signal is provided to the output arm of the servo system via a delay line. In an example embodiment, the application of the DDS signal to the output arm of the servo system enables discontinuous phase changes in at least one of the primary mode beam and the sideband mode beam.

According to an aspect, a servo system coupled to a multi-frequency laser system is provided. In an example embodiment, the servo system is configured to stabilize a relative phase difference and/or a relative frequency difference between a primary mode beam and a sideband mode beam generated by the multi-frequency laser system. In an example embodiment, the servo system comprises an input arm configured to provide an input signal to a servo, the input arm configured to receive a local oscillator signal and a direct digital synthesizer (DDS) signal as input; and an output arm configured to receive an output signal from the servo and a DDS signal.

In an example embodiment, the DDS signal is provided to the output arm of the servo system via a delay line configured to compensate for a time delay for changes in the DDS signal to propagate through the servo system. In an example embodiment, the application of the DDS signal to the output arm of the servo system enables discontinuous phase changes in at least one of the primary mode beam and the sideband mode beam. In an example embodiment, the input arm further receives a beat frequency signal corresponding to a relative frequency difference between the primary mode beam and the sideband mode beam.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like numbers refer to like elements throughout.

As described above, in various atomic systems, it is important to be able to precisely and accurately, in terms of position, frequency, and/or phase, deliver one or more laser beams to the atomic system. For example, in atomic systems such as atomic clocks, Bose-Einstein condensate systems, trapped ion systems, and/or other atomic systems precise and accurate laser beam delivery is important for various uses of the system, manipulating the system, and/or the like. Various example embodiments corresponding to trapped atomic object (e.g., ions) quantum computer systems will now be described in more detail.

Exemplary Quantum Computer System

Figure 1:
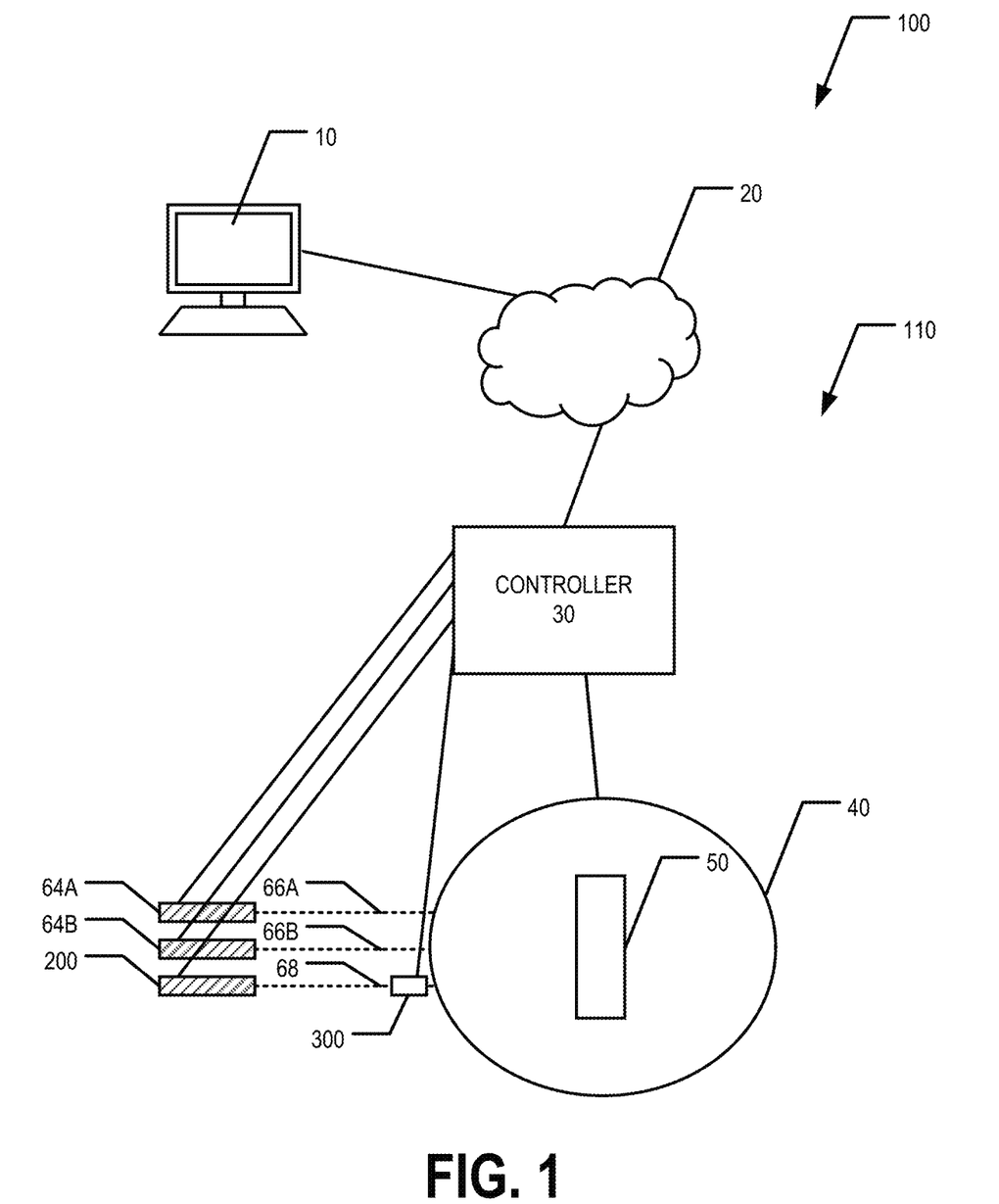
FIG. 1 provides a schematic diagram of an example trapped atomic object quantum computer system, in accordance with an example embodiment.

FIG. 1 provides a schematic diagram of an example trapped atomic object quantum computer system 100, in accordance with an example embodiment. In various embodiments, the quantum computer system 100 comprises a computing entity 10 and a quantum computer 110. In various embodiments, a controller 30 of the quantum computer 110 may be in communication with the computing entity 10 via one or more wired and/or wireless networks 20. In various embodiments, the quantum computer 110 comprises the controller 30, a cryo and/or vacuum chamber 40 enclosing a trap 50, one or more manipulation sources 64 (e.g., 64A, 64B), one or more bichromatic laser systems 200, one or more servo systems 300, and/or the like. In various embodiments, the trap 50 is configured to trap one or more atomic objects therein and the manipulation sources 64 are configured to provide manipulation signals to one or more portions of the trap 50 via optical paths 66 (e.g., 66A, 66B). In various embodiments, the manipulation signals may be used to initialize one or more atomic objects into a qubit space, perform cooling operations, perform measurement operations, and/or the like. In various embodiments, the bichromatic laser system 200 is configured to provide one or more gate signals to one or more portions of the trap 50 to enact one or more quantum gates (e.g., quantum logic gates). In various embodiments, the quantum gates may be one qubit gates, two qubit gates, and/or the like. In various embodiments, the one or more gate signals may be provided to the one or more portions of the trap 50 via optical path(s) 68. In various embodiments, an optical path 68 comprises a servo system 300. In various embodiments, the atomic objects trapped within the trap 50 are ions, atoms, and/or the like. For example, in an example embodiment, an atomic object is an ytterbium ion. In an example embodiment, an atomic object comprises a qubit ion and a corresponding cooling ion.

In various embodiments, a computing entity 10 is configured to allow a user to provide input to the quantum computer system 100 (e.g., via a user interface of the computing entity 10) and receive, view, and/or the like output from the quantum computer system 100. The computing entity 10 may be in communication with the controller 30 via one or more wired or wireless networks 20. For example, the computing entity 10 may be configured to provide quantum circuits to the controller 30 for execution by the quantum computer 110 and the controller 30 may provide the results of executing one or more quantum circuits to the computing entity 10.

In various embodiments, the controller 30 is configured to control the trap 50, cooling and/or vacuum systems (not shown) controlling the temperature and pressure within the cryo and/or vacuum chamber 40, manipulation sources 64, bichromatic laser system 200, servo 300, and/or other components of the quantum computer 110 (e.g., an optical collection system configured for "reading" the output of the quantum computer). In various embodiments, the controller 30 is configured to control various components of the quantum computer 110 in accordance with executable instructions, command sets, and/or the like provided by the computing entity 10 and/or generated by the controller 30. In various embodiments, the controller 30 is configured to receive output from the quantum computer 110 (e.g., from an optical collection system) and provide the output and/or the result of processing the output to the computing entity 10.

Exemplary Bichromatic Laser System

Figure 2:
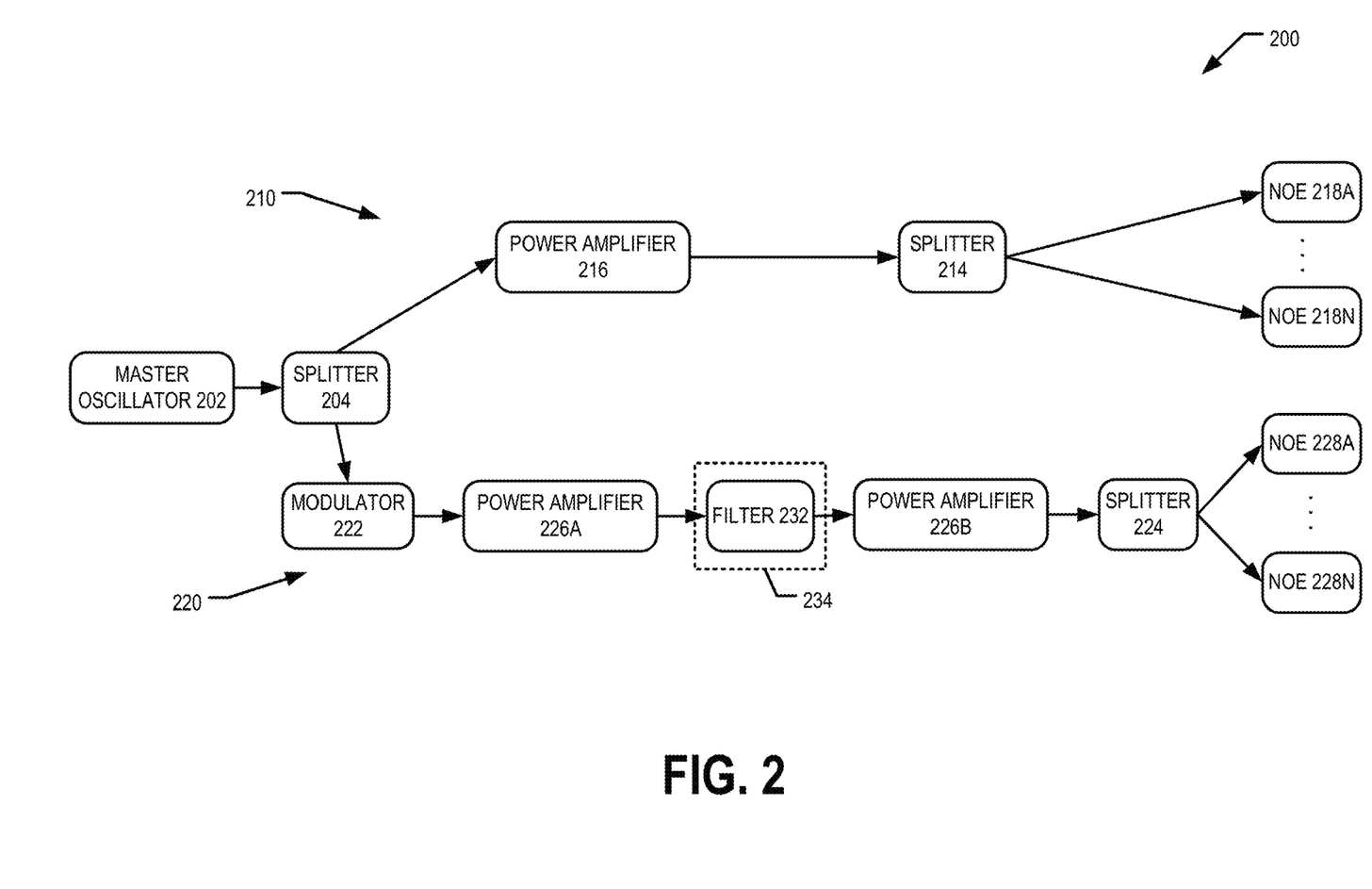
FIG. 2 provides a block diagram of an example bichromatic laser system, in accordance with an example embodiment.

In various embodiments, a bichromatic laser system 200 provides one or more gate signals to one or more portions of a trap 50 having atomic objects trapped therein for use as qubits of a quantum computer 110. The gate signals provided by the bichromatic laser system 200 comprise a primary mode beam and a sideband mode beam. The primary mode beam and the sideband mode beam have a relative frequency difference $\Delta > 0$. In an example embodiment, the relative frequency difference $\Delta$ is approximately equal to the frequency difference between the two states in the qubit space. For example, if the qubit space is defined based on hyperfine splitting of energy levels of the atomic objects, the relative frequency difference $\Delta$ may be on the order of 100 MHz to 100 GHz. In an example embodiment, the relative frequency difference $\Delta$ is approximately 12-13 GHz.

FIG. 2 provides a block diagram of bichromatic laser system 200, according to an example embodiment. In various embodiments, a bichromatic laser system 200 comprises a master oscillator 202. In various embodiments, the master oscillator 202 is a laser. In various embodiments, the master oscillator 202 is a laser coupled to a resonance chamber and/or other laser oscillator. In an example embodiment, the master oscillator 202 is a diode laser coupled to a tapered amplifier. In an example embodiment, the master oscillator 202 is a low phase noise laser. In an example embodiment, the master oscillator 202 is configured to generate a master beam. In an example, embodiment, the master beam is a laser beam having a characteristic wavelength that is approximately twice the characteristic wavelength of the primary mode beam of the gate signal provided by the bichromatic laser system 200. For example, in an example embodiment, the characteristic wavelength of the master oscillator 202 is 740 nm and the characteristic wavelength of the primary mode beam of the gate signal is 370 nm.

In various embodiments, the master oscillator 202 is optically coupled to an arm splitter 204. In various embodiments, a master beam generated by the master oscillator 202 is provided to an arm splitter 204 (e.g., via an optical fiber, waveguide, free space optical path, and/or the like). For example, the arm splitter 204 may be configured to split the master beam into two or more beams that may be conditioned by the primary mode arm 210 and sideband mode arm 220 to generate and/or provide a primary mode beam and a sideband mode beam, respectively. For example, the arm splitter 204 may be configured to split the master beam provided by the master oscillator 202 into two or more beams. In an example embodiment, the arm splitter 204 is a 1×2 splitter and is configured to split the master beam provided by the master oscillator 202 into two beams. In an example embodiment, the arm splitter 204 is configured to split the master beam provided by the master oscillator 202 into two beams of approximately the same intensity. For example, the arm splitter 204 may split the master beam provided by the master oscillator 202 into a first beam that is provided to a primary mode arm 210 of the bichromatic laser system 200 and a second beam that is provided to a sideband mode arm 220 of the bichromatic laser system 200.

In an example embodiment, the first beam is transmitted from the arm splitter 204 to a power amplifier 216. For example, the first beam may be transmitted from the arm splitter 204 to the power amplifier 216 via an optical fiber, waveguide, free space optical path, and/or the like. In various embodiments, the power amplifier 216 is configured to amplify and/or increase the intensity of the first beam. In an example embodiment, the power amplifier 216 is configured to amplify and/or increase the intensity of a primary mode of the first beam. The amplified first beam may then be transmitted from the power amplifier 216 to a splitter 214. For example, the amplified first beam may be transmitted from the power amplifier 216 to the splitter 214 via an optical fiber, waveguide, free space optical path, and/or the like. In various embodiments, the splitter 214 is a 1 to N splitter, where N is a positive integer. For example, the splitter 214 may split the amplified first beam into N primary beams. Each of the N primary beams may be provided (e.g., via an optical fiber, waveguide, free space optical path, and/or the like) to a corresponding set of nonlinear optical elements (NOE) 218 (e.g., 218A, . . . , 218N). In various embodiments, each set of NOE 218 is configured to double the frequency of the primary beam (e.g., reduce the wavelength of the primary beam by a factor two) to provide a primary mode beam. For example, a set of NOE 218 may comprise an intracavity doubling module for doubling the frequency of the primary beam to generate a primary mode beam. For example, a set of NOE 218 may comprise a second harmonic generation module. In another example, a set of NOE 218 may comprise one or more acousto-optical modulators (AOMs) that may be used to double the frequency of the primary beam to generate a primary mode beam. In various embodiments, a set of NOE 218 may be configured to condition the primary mode beam. For example, the set of NOE 218 may include one or more modulators and/or beam shaping elements configured to modulate the primary mode beam, suppress any undesired sidebands and/or harmonics, shape the primary mode beam, and/or the like as appropriate for the application.

In various embodiments, the second beam is transmitted from the arm splitter 204 to a modulator 222. For example, the second beam may be transmitted from the arm splitter 204 to the modulator 222 via an optical fiber, waveguide, free space optical path, and/or the like. In an example embodiment, the modulator 222 is a fiber or wave-guide electro-optical modulator; though a variety of modulators may be used in various embodiments. In various embodiments, the modulator 222 may be configured to phase modulate the second beam. For example, the phase modulation of the second beam (e.g., by the modulator 222) may generate a beam comprising plurality of sidebands that have a shifted frequency with respect to the second beam. In various embodiments, a sideband is a band of frequencies higher or lower than the frequency of the second beam from which the beam comprising a plurality of sidebands was generated.

In an example embodiment, the modulator 222 phase modulates the second beam at a frequency of $\Delta/2$, where $\Delta$ is the relative frequency difference between the primary mode beam and the sideband mode beam. For example, one of the sideband modes may have a peak frequency that is shifted frequency with respect to the second beam (and/or the first beam and/or the master beam and/or the primary beam) by approximately half of the relative frequency difference $\Delta$ between the primary mode beam and the sideband mode beam.

The beam comprising the plurality of sidebands may then be provided (e.g., via optical fiber, waveguide, free space optical path, and/or the like) to a power amplifier 226A. In various embodiments, the power amplifier 226A is configured to amplify and/or increase the intensity of the beam comprising the plurality of sidebands. The output of the power amplifier 226A is then be provided to a filter 232. In various embodiments, the filter 232 is a narrow band filter configured to select the desired sideband from the amplified beam comprising the plurality of sidebands. In an example embodiment, the filter 232 is an etalon (e.g., a near infrared etalon). An etalon is a device comprising of two reflecting glass plates that may be used for selection of light of a particular frequency (e.g., based on the distance between the two glass plates). In an example embodiment, the filter 232 is within a heat controlled oven 234. For example, the heat controlled oven 234 may maintain the filter 232 at a steady temperature so as to increase the stability of the sideband selection properties of the filter 232. For example, the heat controlled oven 234 may increase the stability of the selected sideband that the filter 232 passes to the power amplifier 226B. In an example embodiment, the filter 232 suppresses the unselected sidebands to <1% of their intensity in the amplified beam comprising the plurality of sidebands. In an example embodiment, the selected sideband is a sideband have a frequency difference with respect to the second beam (and/or first beam and/or master beam and/or primary beam) of $\Delta/2$. In various embodiments, a selected sideband beam is provided by the filter 232 to the power amplifier 226B.

In various embodiments, the selected sideband beam is provided to the power amplifier 226B (e.g., by optical fiber, waveguide, free space optical path, and/or the like) for amplification. In various embodiments, the power amplifier 226B comprises a second harmonic generation (SHG) cavity. Thus, the power amplifier 226B may act to amplify and/or increase the intensity of the selected sideband beam and to further suppress the sidebands not selected by the filter 232. In an example embodiment, the power amplifier 226B may suppress the sidebands not selected by the filter 232 by approximately −30 dB. The amplified selected sideband beam may then be provided to a splitter 224. For example, the amplified selected sideband beam may be transmitted from the power amplifier 226B to the splitter 224 via an optical fiber, waveguide, free space optical path, and/or the like. In various embodiments, the splitter 224 is a 1 to N splitter, where N is a positive integer. For example, the splitter 224 may split the amplified selected sideband beam into N sideband beams. Each of the N sideband beams may be provided (e.g., via an optical fiber, waveguide, free space optical path, and/or the like) to a corresponding set of nonlinear optical elements (NOE) 228 (e.g., 228A, . . . , 228N). In various embodiments, each set of NOE 228 is configured to double the frequency of the sideband beam (e.g., reduce the wavelength of the sideband beam by a factor two) to provide a sideband mode beam. In various embodiments, the frequency difference between the sideband beam and the primary beam is half the final relative frequency difference (e.g., $\Delta/2$). The frequency difference between the sideband beam and the primary mode beam is the final relative frequency difference $\Delta$. For example, a set of NOE 228 may comprise an intracavity doubling module and/or second harmonic generation module for doubling the frequency of the sideband beam to generate a sideband mode beam. In another example, a set of NOE 228 may comprise one or more AOMs that may be used to double the frequency of the sideband beam to generate a sideband mode beam. In various embodiments, a set of NOE 228 may be configured to condition the sideband mode beam. For example, the set of NOE 228 may include one or more modulators and/or beam shaping elements configured to modulate the sideband mode beam, further suppress un-selected sidebands, shape the sideband mode beam, and/or the like as appropriate for the application.

In various embodiments, the doubling of the frequency of the sideband beam to generate the sideband mode beam increases (e.g., doubles) the frequency difference between the selected sideband and any residual un-selected sidebands still present in the sideband beam. For example, the selected sideband may have a frequency of $f_1$ in the sideband beam and a residual un-selected sideband may have a frequency of $f_2$ in the sideband beam. The frequency difference between the selected sideband and the residual un-selected sideband in the sideband beam is therefore $f_1-f_2$. In the sideband mode beam, after the frequency doubling, the selected sideband will have a frequency of $2f_1$ and the residual un-selected sideband will have a frequency of $2f_2$. The frequency difference between the selected sideband and the residual un-selected sideband in the sideband mode beam is therefore $2(f_1-f_2)$. Thus, the frequency doubling performed by the set of NOE 228 causes the frequency of any residual un-selected sidebands to be shifted away from qubit transition frequency. In an example embodiment, the set of NOE 228 may comprise one or more AOMs that apply a frequency offset to any residual un-selected sidebands still present in the sideband beam. For example, the one or more AOMs may apply an approximately 200 MHz frequency offset, in an example embodiment, to any residual un-selected sidebands still present in sideband beam. Thus, any residual un-selected sidebands present in the sideband beam after the filtering of the sidebands (e.g., by the filter 232) and the sideband suppression provided by the power amplifier (e.g., via second harmonic generation cavity) may then be shifted such that the frequency of the residual un-selected sidebands are far off resonant from the qubit transition frequency.

In various embodiments, the primary mode beam and the sideband mode beam are delivered to a portion of the trap 50 (e.g., via optical path 68) as a single beam (e.g., the primary mode beam and the sideband mode beam may be combined and provided as a single gate signal. In an example embodiment, the primary mode beam and the sideband mode beam may be provided to the trap 50 (e.g., via optical paths 68) as two distinct beams (e.g., copropagating, non-copropagating, orthogonal, or counter-propagating, as appropriate for the application) to provide a gate signal. For example, the gate signal may be a combination of the primary mode beam and the sideband mode beam that are combined prior to the beams being provided to the trap 50 or that interact approximately and/or semi-simultaneously with one or more atomic objects within the trap 50.

In various embodiments, the splitters 214, 224 split the amplified first beam and the amplified filtered second beam into N primary beams and N sideband beams, respectively. In an example embodiment, N pairs of primary beams and sideband beams may each be delivered to a particular portion of the trap 50. For example, a first primary beam and a first sideband beam may be conditioned by the corresponding NOE 218A, 228A to provide a first primary mode beam and a first sideband mode beam to a first portion of the trap 50 and an Nth primary beam and an Nth sideband beam may be conditioned by the corresponding NOE 218N, 228N to provide an Nth primary mode bean and an Nth sideband mode beam to an Nth portion of the trap 50.

In various embodiments, the phase noise (e.g., relative phase difference, and/or the like) between a primary mode beam and a corresponding sideband mode beam is minimized. For example, the path length of primary mode arm 210 and the sideband mode arm 220 of the bichromatic laser system 200 may be approximately equal. For example, the path length of the primary mode arm 210 and the sideband mode arm 220 may be designed such that the accumulated phase (relative to the phase of the first beam as it exits the arm splitter 204) of a sideband mode beam due to propagation and conditioning through the sideband mode arm 220 and the accumulated phase (relative to the phase of the second beam as it exits the arm splitter 204) of a primary mode beam due to propagation and conditioning through the primary mode arm 210 are approximately equal. For example, the phase difference between the sideband mode beam and the primary mode beam may be measured as the fiber optic length of the primary mode arm 210 and/or sideband mode arm 220 is varied. Based on the measurements, an optimal fiber optic length for the primary mode arm 210 and/or sideband mode arm 220 such that the phase noise and/or phase difference between the primary mode beam and the sideband mode beam is minimized and/or set to a desired value.

In an example embodiment, the amplified first beam (e.g., provided as the output of power amplifier 216) may be provided as the primary beam and/or primary mode beam and the amplified selected sideband beam (e.g., provided as the output of the power amplifier 226B) may be provided as the sideband beam and/or sideband mode beam. In other words, an example embodiment does not include the splitters 214, 224 and/or the one or more sets of NOEs 218, 228.

In various embodiments, a servo system 300 is used to stabilize relative phase and/or relative frequency difference between the primary mode beam and the sideband mode beam. In an example embodiment, the servo system 300 is used to suppress phase noise between the primary mode beam and the sideband mode beam by stabilizing the relative phase of the primary and sideband mode beams to a reference oscillator. In an example embodiment, the reference oscillator is a low-noise radio frequency (RF) oscillator. In an example embodiment, the servo system 300 uses a double-pass AOM as a phase/frequency actuator, which allows for agile phase/frequency control of the primary and sideband mode beams by mixing a computer-controlled direct digital synthesizer (DDS) signal with the reference oscillator signal. The DDS signal is provided to the servo system 300 at multiple points. For example, the DDS signal may be mixed with the reference oscillator and provided as input to the servo of the servo system 300 and may be fed-forward to the AOM actuator. Such feed-forward provision of the DDS signal enables quasi-simultaneous and/or near real-time frequency changes and/or phase jumps to be enacted while under closed-loop control. In an example embodiment, the DDS signal is provided to the AOM actuator via a delay line configured to compensate for the acousto-optic delays corresponding to the propagation of signals from the initial DDS application point (e.g., the servo reference point) and the AOM actuator. For example, the use of the delay line minimizes glitches and servo perturbations that may otherwise be introduced to a change in the DDS signal as it propagates through the servo system 300. In an example embodiment, a first DDS signal generated by a first DDS is provided to the input arm of the servo system and a second DDS signal generated by a second DDS is provided to the output arm of the servo system, where the relative timing of the first and second DDS signals is controlled to account and/or compensate for the acousto-optic delays between the initial DDS application point (e.g., in the input arm) and the AOM actuator (e.g., in the output arm). In an example embodiment, a servo system 300 is used to stabilize the relative frequency and/or phase between the primary and sideband mode beams when the primary and sideband mode beams are provided to the trap 50 as copropagating beams.

In an example embodiment, the primary and sideband mode beams are provided to the trap 50 as non-copropagating beams. In an example embodiment, when the primary and sideband mode beams are provided to the trap 50 as non-copropagating beams, the primary and sideband mode beams are phase-locked to a reference oscillator. In an example embodiment, the reference oscillator is a low noise local oscillator. In an example embodiment, the primary and sideband mode beams are phase-locked to the reference oscillator by actuating an AOM. In an example embodiment, the AOM is a double-pass near-infrared AOM prior to the primary beams being provided to the set of NOE 218, 228. In an example embodiment, the heterodyne beat frequency (e.g., generated by combining at least a portion of a primary mode beam and at least a portion of a sideband mode beam) is measured after the set of NOE 218, 228 (e.g., based on the primary mode beam and the sideband mode beam) and actuated (e.g., an AOM configured to perform the frequency doubling is actuated) before the set of NOE 218, 228 (e.g., acting on the primary beam and sideband beam). Actuating the AOM prior to the amplifier and/or second harmonic generation cavity of the NOE 218, 228 enables operation of the AOM with approximately no optical loss since the optical amplifier can be driven into saturation, for example, in the case of an ultraviolet beams.

Exemplary Servo System

Figure 3A:
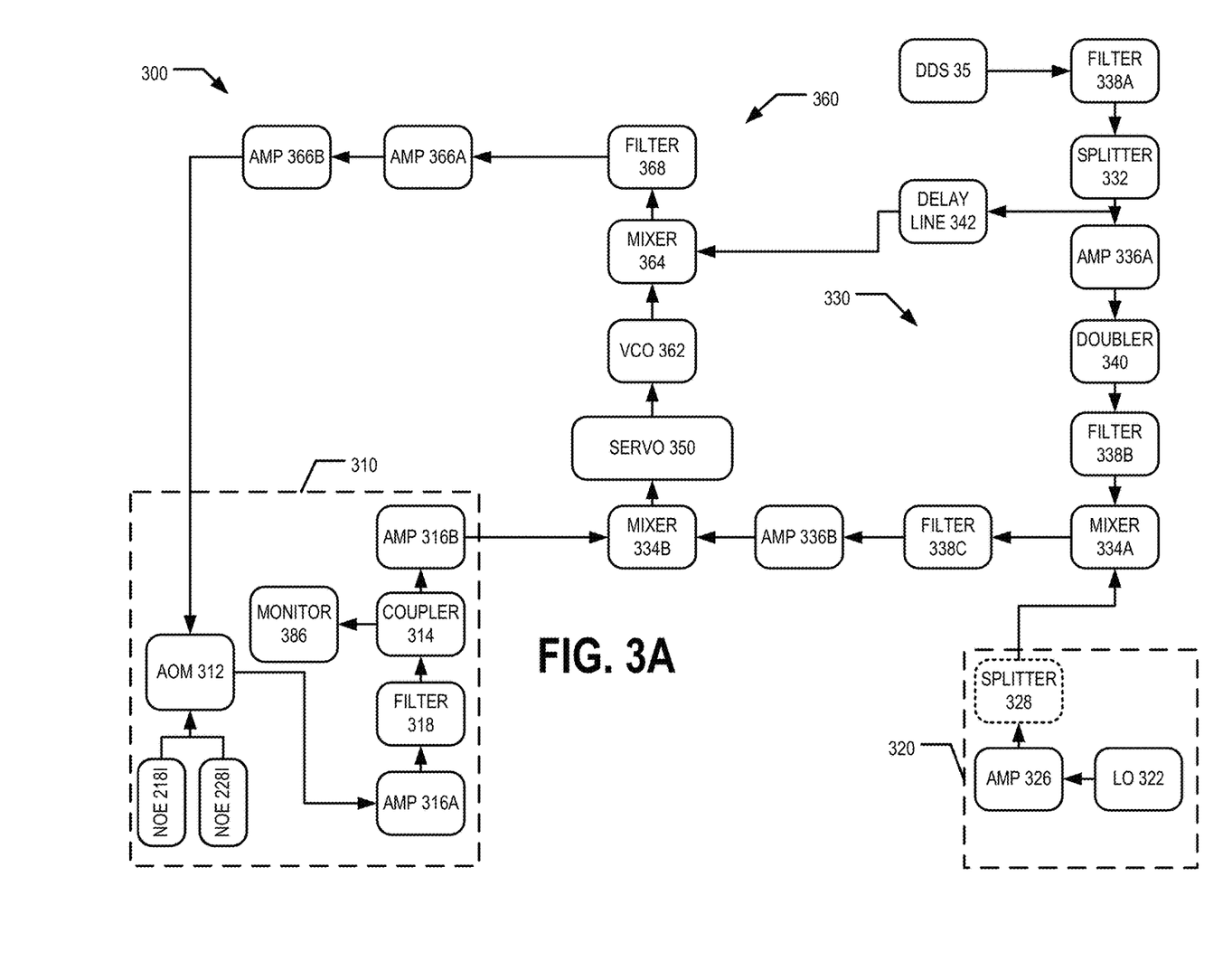
FIG. 3A provides a block diagram of an example servo system, in accordance with an example embodiment.

In various embodiments, a servo system 300 is configured to provide frequency and/or phase control over the primary mode beam and sideband mode beam. For example, the servo system 300 may be configured to ensure the relative frequency difference $\Delta$ is the desired value and/or does not change with time. For example, the servo system 300 may be configured to lock the relative phase of the primary mode beam and sideband mode beam such that the relative phase noise between the primary mode beam and sideband mode beam is controlled and/or minimized. In another example, the servo system 300 may be configured to change the phase of the primary mode beam and/or the sideband mode beam. For example, the servo system 300 may cause the phase of the primary mode beam and/or sideband mode beam to "jump" forward to a desired phase.

In various embodiments, the relative frequency difference $\Delta$, phase, and relative phase of the primary mode beam and the sideband mode beam are controlled via a computer controlled direction digital synthesis (DDS) signal. For example, the DDS signal may be used to actuate a double-pass AOM. For example, the double-pass AOM may be configured to control the relative frequency difference $\Delta$, the phase of the primary mode beam, the phase of the sideband mode beam, and/or the relative phase difference between the primary mode beam and the sideband mode beam. The DDS signal is provided to both the AOM and the servo locking circuitry, such that any updates are provided in a feed-forward manner. For example, providing the DDS signal to both the AOM and the servo locking circuitry enables quasi-simultaneous updates to the phase of the primary mode beam and/or sideband mode beam even when the phase updates include discrete and/or discontinuous changes in phase (e.g., phase "jumps"). For example, a delay line may be used to couple the DDS signal to both the AOM and the servo locking circuit. For example, the delay line ensures proper timing of the application of the DDS signal to the locking circuitry relative to the application of the DDS signal to the AOM.

FIG. 3A provides a block diagram illustrating an example architecture of an example servo system 300. In an example embodiment, the servo system 300 comprises an AOM arm 310, local oscillator arm 320, servo input arm 330, servo 350, and a servo output arm 360.

Figure 3B:
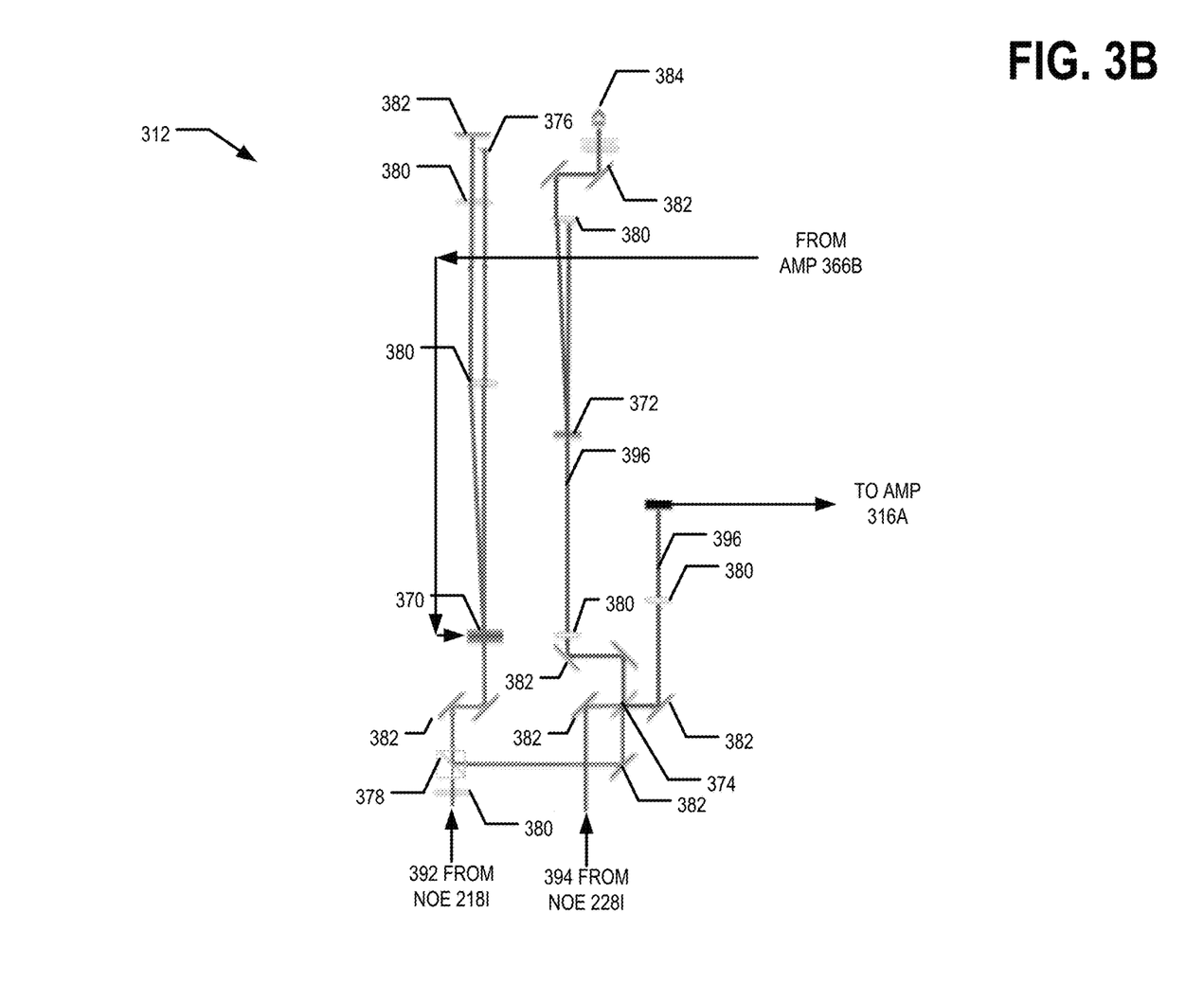
FIG. 3B provides a schematic diagram of an example double-pass acoustic-optical modulator (AOM), in accordance with an example embodiment.

In various embodiments, the AOM arm 310 receives a primary mode beam from a set of NOE 218 and a sideband mode beam from a set of NOE 228. The primary mode beam and sideband mode beam are provided to an AOM 312. In an example embodiment, the AOM 312 is a double-pass AOM that acts as a frequency/phase actuator. FIG. 3B illustrates a schematic of an example AOM 312. For example, optical paths may be defined via optical elements such as mirrors 382, lenses 380, beam splitter 378, and/or other passive or active optical components. Beam combiner 374 combines a portion of the primary mode beam 392 and sideband mode beam 394 to generate a beat frequency beam 396. In various embodiments, the beat frequency beam 396 the frequency of beat frequency beam 396 is used to monitor the relative frequency difference $\Delta$ between the primary mode beam and the sideband mode beam (e.g., via frequency monitor 386) and/or to monitor the phase difference between the primary mode beam and the sideband mode beam (e.g., via phase difference monitor 384). In an example embodiment, the AOM 312 comprises an AOM switch 372. In an example embodiment, the AOM switch 372 receives an actuating signal from a DDS (e.g., DDS 35). In an example embodiment, the AOM 312 further comprises an actuatable AOM 370. In an example embodiment, the actuatable AOM 370 receives a signal that is provided as output of the servo output arm 360. In an example embodiment, the actuatable AOM 370 is an dual pass AOM. In an example embodiment, a dual pass AOM is an AOM where the optical path passes through the AOM twice. In an example embodiment, the signal received by the actuatable AOM 370 from the servo output arm 360 is an approximately 30-40 dBm signal. In an example embodiment, the AOM 312 comprises a beam stop 376. However, in various embodiments, the beam stop 376 may be replaced with one or more measurement devices and/or other optical components configured to receive an output from the AOM 312.

In various embodiments, as shown in FIG. 3A, an amplifier 316A receives the beat frequency beam 396. The amplifier 316A may amplify the beat frequency beam 396 (e.g., increase and/or amplify the intensity of the beat frequency beam). The amplified beat frequency beam is then filtered via filter 318. A coupler 314 and/or splitter is used to provide the amplified beat frequency beam to both a monitor 386 for monitoring the frequency and/or phase of the beat frequency beam (e.g., via a spectral analyzer) and to an amplifier 316B. The amplifier 316B may then amplify the received portion of the amplified beat frequency signal and provide the signal to a mixer 334B of the servo input arm 330.

In various embodiments, the servo system 300 comprises a plurality of filters 318, 338A, 338B, 338C, 368. These filters may be used to isolate particular tones and/or frequencies in the beams propagating through the servo system 300. For example, the filters may be configured to filter out undesired sidebands and/or harmonics generated and/or amplified via an amplifier, filter out undesired mixing products (e.g., parasitic mixing tones) generated by mixing signals via a mixer 334A, 334B, 364, and/or the like. In various embodiments, the filters 318, 338A, 338B, 338C, 368 prevent undesired components of a beam (e.g., generated through an amplification, mixing, nonlinear optical function, and/or the like) to be removed from the beam to prevent further processing of the undesired components of the beam by the servo system 300.

In various embodiments, the local oscillator arm 320 comprises at least one local oscillator 322. In an example embodiment, the at least one local oscillator 322 is a low noise local oscillator. In an example embodiment, the at least one oscillators 322 is a low noise radio frequency oscillators. In an example embodiment, the frequency of the at least one local oscillator 322 (and/or a combination of the frequencies of the local oscillators if there is more than one local oscillator 322) is substantially similar to the frequency difference between the two states in the qubit space. For example, the frequency of the at least one local oscillator 322 (and/or a combination of the frequencies of the local oscillators if there is more than one local oscillator 322) may be approximately equal to the relative phase difference Δ of the two tones of the bichromatic laser beam. The local oscillator signal is provided to amplifier 326 for amplification, in an example embodiment. In an example embodiment, the amplifier 326 is a powered amplifier. In an example embodiment, the amplifier 326 comprises a second harmonic generation (SHG) cavity. The amplifier 326 may then optionally provide the amplified local oscillator signal to a splitter 328. For example, the local oscillator arm 320 may be coupled to multiple circuits to provide local oscillator signals to the multiple circuits, in an example embodiment. In an example embodiment, the amplifier 326 and/or the splitter 328 provides the amplified local oscillator signal to a mixer 334A of the servo input arm 330.

In various embodiments, a DDS signal 35 is generated (e.g., by the controller 30 and/the controller 30 may cause a DDS to generate a DDS signal 35). The DDS signal 35 is filtered by filter 338A and provided to splitter 332. Splitter 332 provides a portion of the filtered DDS signal to the delay line 342 and a portion of the filtered DDS signal to amplifier 336A. The amplifier 336A provides an amplified filtered DDS signal to a doubler 340. In an example embodiment, the doubler 340 comprises a second harmonic generation cavity. The doubler 340 doubles the frequency of the amplified filtered DDS signal to generate a doubled DDS signal, which is then filtered by filter 338B. The filtered doubled DDS signal is then mixed with the amplified mixed local oscillator (LO) signal by the mixer 334A to generate a DDS-LO signal. The DDS-LO signal is filtered by filter 338C. The filtered DDS-LO signal is then amplified by amplifier 336B before the filtered DDS-LO signal is mixed with the amplified beat frequency signal by mixer 334B. The DDS-LO-beat frequency signal is then provided as input to the servo 350. In various embodiments, the servo 350 is configured to detect changes in the optical DDS-LO-beat frequency signal provided as input thereto and may modify the electrical signal provided as output of the servo 350 as a function of the detected changes in the optical DDS-LO-beat frequency signal.

The servo 350 provides an output signal to servo output arm 360. In an example embodiment, the output signal is provided as input to a voltage-controlled oscillator (VCO) 362 which then generates an optical signal based on the electrical output signal of the servo 350. Mixer 364 receives the VCO generated optical signal and the filtered DDS signal provided via the delay line 342. The mixer 364 combines the VCO generated optical signal and the filtered DDS signal, which is then filtered by filter 368. The filtered VCO-DDS signal is then provided to at least one amplifier 366A, 366B to increase and/or amplify the intensity of the filtered VCO-DDS signal before the filtered VCO-DDS signal is provided as input to the AOM 312 (e.g., actuatable AOM 370).

Thus, the servo system 300 provides a closed-loop feedback system that enables the primary mode beam and the sideband mode beam to provided with a controlled relative phase difference Δ and controlled and/or minimized relative phase difference.

In various embodiments, signals, beams, and/or the like may be propagated between various elements of the servo system 300 using fiber optics, waveguides, free space optics, and/or the like. In an example embodiment, the amplifiers 316A, 316B, 326, 336A, 336B, 366A, 366B may be power amplifiers. For example, one or more of the amplifiers 316A, 316B, 326, 336A, 336B, 366A, 366B may comprise a resonance cavity, and/or the like.

Technical Advantages

Various embodiments provide technical solutions to the technical problem of precisely and accurately, in terms of frequency, frequency offset, and/or phase, delivering multi-frequency (e.g., bichromatic) laser beams to a trap (e.g., enclosed within a cryo and/or vacuum chamber, in an example embodiment) of a trapped atomic object quantum computer. In particular, various embodiments provide an improvement over traditional means by providing a laser beam and/or sets/pairs of laser beams that have stable relative frequency differences A, stable and/or minimized relative phase differences (e.g., low phase noise). Various embodiments enable non-continuous changes in phase of the primary and/or sideband mode beams. Due to the stability of the relative frequency differences Δ and the phase control of the primary and/or sideband mode beams, quantum gates enacted on qubits of the quantum computer 110 using the primary and/or sideband mode beams are performed with high fidelity. Thus, various embodiments provide for high gate fidelity for performing operations on qubits in the trapped atomic object quantum computer. Embodiments of the present invention therefore provide an improvement to the operation of a quantum computer.

Exemplary Controller

In various embodiments, a quantum computer 110 further comprises a controller 30 configured to control various elements of the quantum computer 110. In various embodiments, a controller 30 may be configured to cause a quantum computer 110 to perform various operations (e.g., computing operations such as gate operations, cooling operations, transport operations, qubit interaction operations, qubit measure operations, leakage suppression operations, and/or the like). For example, the controller 30 may be configured to cause manipulation sources 64A, 64B to provide manipulation signals to atomic objects trapped within the trap 50. For example, the controller 30 may be configured to cause the bichromatic laser system 200, possibly in coordination with servo system 300, to provide one or more gate signals to one or more atomic objects trapped within the trap 50 so as to enact, for example, one or more quantum gates. In various embodiments, the controller 30 may be configured to control a cryogenic system and/or vacuum system controlling the temperature and pressure within the cryogenic and/or vacuum chamber 40, manipulation sources 64, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more atomic within the trap 50.

Figure 4:
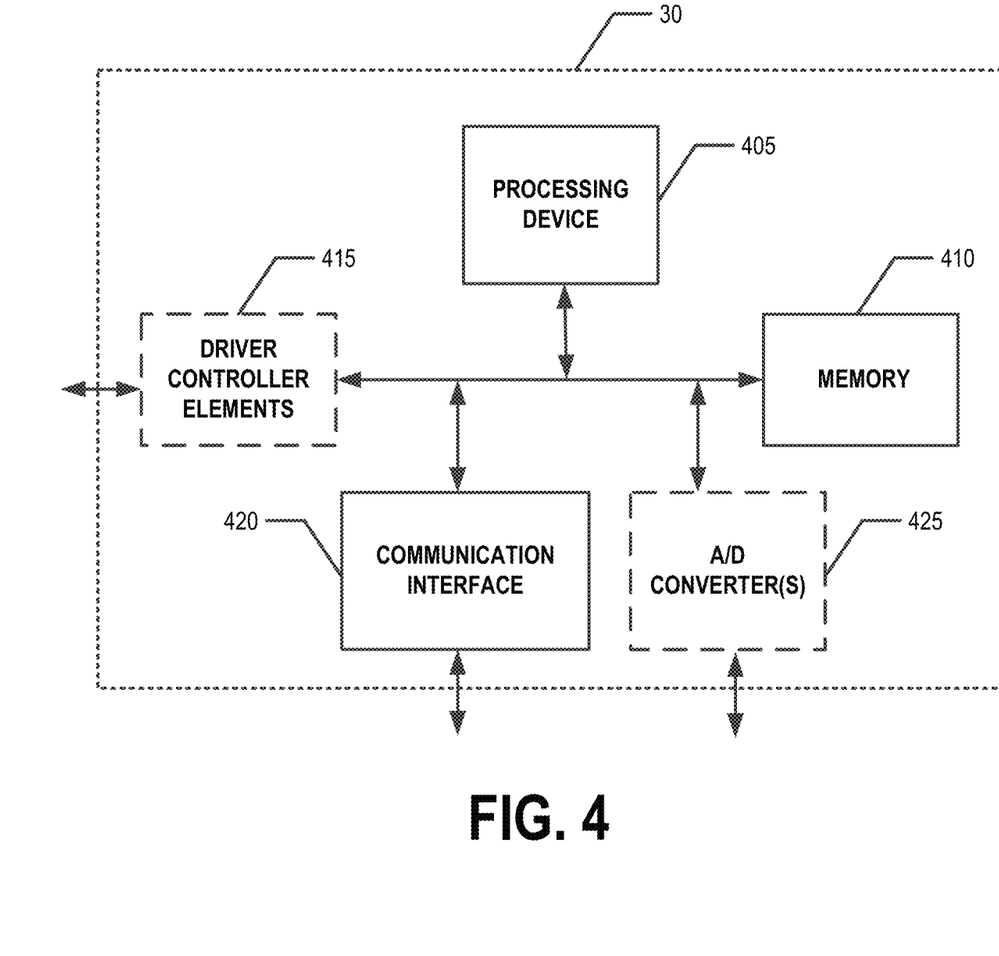
FIG. 4 provides a schematic diagram of an example controller that may be used in accordance with an example embodiment.

As shown in FIG. 4, in various embodiments, the controller 30 may comprise various controller elements including processing elements 405, memory 410, driver controller elements 415, a communication interface 420, analog-digital converter elements 425, and/or the like. For example, the processing elements 405 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like, and/or controllers. The term circuitry may refer to an entirely hardware embodiment or a combination of hardware and computer program products. In an example embodiment, the processing element 405 of the controller 30 comprises a clock and/or is in communication with a clock.

For example, the memory 410 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 410 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language(s), and/or the like), and/or the like. In an example embodiment, execution of at least a portion of the computer program code stored in the memory 410 (e.g., by a processing element 405) causes the controller 30 to perform one or more steps, operations, processes, procedures and/or the like described herein for tracking the phase of an atomic object within an atomic system and causing the adjustment of the phase of one or more manipulation sources and/or signal(s) generated thereby.

In various embodiments, the driver controller elements 415 may include one or more drivers and/or controller elements each configured to control one or more drivers. In various embodiments, the driver controller elements 415 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 405). In various embodiments, the driver controller elements 415 may enable the controller 30 to operate that bichromatic laser system 200, servo system 300, manipulation sources 64, operate vacuum and/or cryogenic systems, and/or the like. In various embodiments, the drivers may be laser drivers; microwave drivers; vacuum component drivers; cryogenic and/or vacuum system component drivers; current drivers, and/or the like. For example, the drivers and/or driver controllers may be configured to cause a magnetic field generation device (e.g., comprising circuitry coupled to a voltage source (e.g., a current driver or voltage driver), permanent magnet(s), and/or a combination thereof) to generate a magnetic field having a particular direction and magnitude at one or more positions of the trap 50. In various embodiments, the controller 30 comprises means for communicating and/or receiving signals from one or more optical receiver components such as cameras, MEMs cameras, CCD cameras, photodiodes, photomultiplier tubes, and/or the like. For example, the controller 30 may comprise one or more analog-digital converter elements 425 configured to receive signals from one or more optical receiver components, calibration sensors, and/or the like.

In various embodiments, the controller 30 may comprise a communication interface 420 for interfacing and/or communicating with a computing entity 10. For example, the controller 30 may comprise a communication interface 420 for receiving executable instructions, command sets, and/or the like from the computing entity 10 and providing output received from the quantum computer 110 (e.g., from an optical collection system) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

Figure 5:
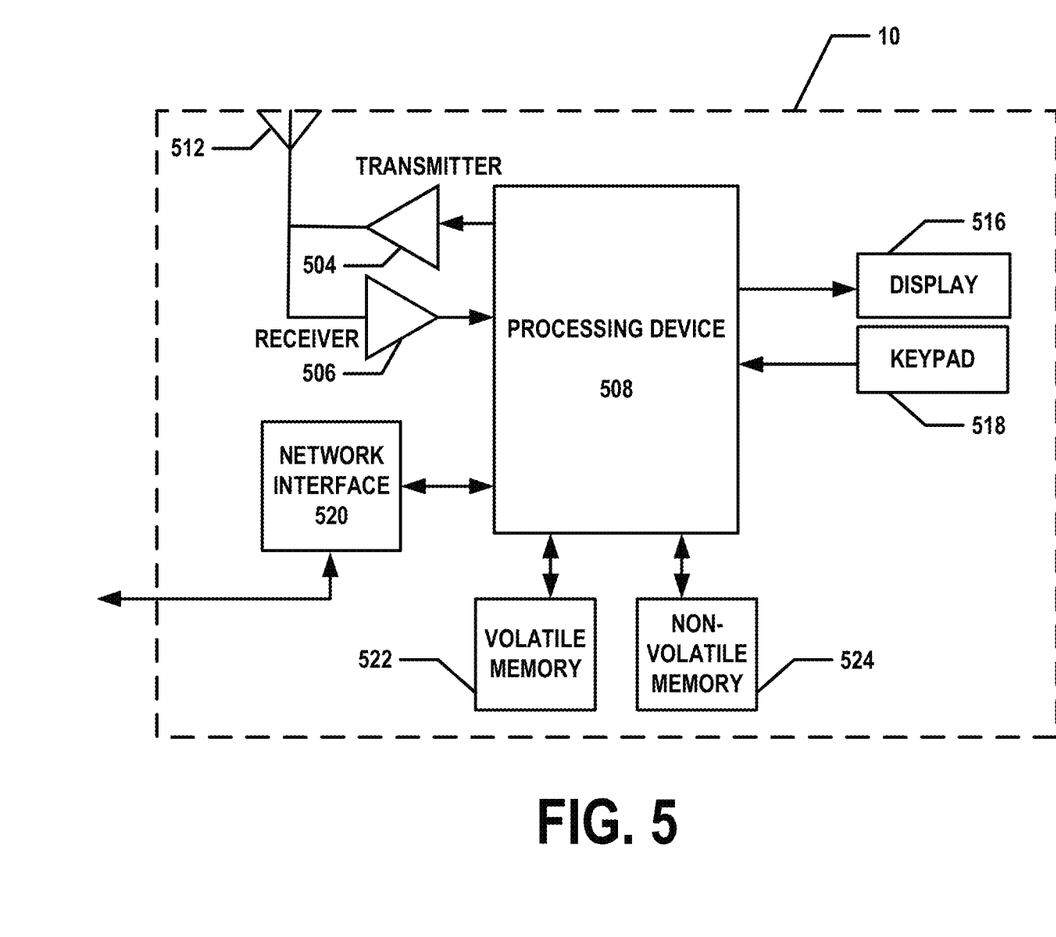
FIG. 5 provides a schematic diagram of an example computing entity that may be used in accordance with an example embodiment.

FIG. 5 provides an illustrative schematic representative of an example computing entity 10 that can be used in conjunction with embodiments of the present invention. In various embodiments, a computing entity 10 is configured to allow a user to provide input to the quantum computer 110 (e.g., via a user interface of the computing entity 10) and receive, display, analyze, and/or the like output from the quantum computer 110. For example, a user may operate a computing entity 10 to generate and/or program a quantum algorithm and/or quantum circuit (e.g., that includes a D-state AC-Stark shift gate) that may be provided such that the controller 30 may receive the quantum algorithm and/or quantum circuit and cause the quantum computer 110 to perform the quantum algorithm and/or quantum circuit.

As shown in FIG. 5, a computing entity 10 can include an antenna 512, a transmitter 504 (e.g., radio), a receiver 506 (e.g., radio), and a processing element 508 that provides signals to and receives signals from the transmitter 504 and receiver 506, respectively. The signals provided to and received from the transmitter 504 and the receiver 506, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 516 and/or speaker/speaker driver coupled to a processing element 508 and a touch screen, keyboard, mouse, and/or microphone coupled to a processing element 508). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 518 (hard or soft), a touch display, voice/speech or motion interfaces, scanners, readers, or other input device. In embodiments including a keypad 518, the keypad 518 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 522 and/or non-volatile storage or memory 524, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A multi-frequency laser system comprising:
a master oscillator configured to generate a master beam;
an arm splitter configured to split the master beam into a first beam and a second beam, the first beam provided to a primary mode arm for generation of a primary mode beam and the second beam provided to a sideband mode arm for generation of a sideband mode beam; and
the sideband beam arm comprising:
a modulator configured to modulate the second beam to generate a beam comprising sidebands;

a filter configured to select a particular sideband mode from the beam comprising sidebands to generate a selected sideband beam;

an amplifier cavity configured to amplify the particular sideband mode and suppress other residual modes of the selected sideband mode; and an acousto-optical modulator configured to shift the frequency of each mode of an amplified selected sideband beam to generate a sideband mode beam, wherein the primary mode beam and sideband mode beam are provided in a coordinated manner to one or more atomic objects to enact a quantum gate.

2. The multi-frequency laser system of claim 1, wherein the filter is an etalon.

3. The multi-frequency laser system of claim 2, wherein the etalon is maintained at a constant temperature by a temperature controlled oven.

4. The multi-frequency laser system of claim 1, wherein the primary mode arm and the sideband mode arm each comprise a set of nonlinear optical elements.

5. The multi-frequency laser system of claim 4, wherein the set of nonlinear optical elements comprises a second harmonics generation cavity.

6. The multi-frequency laser system of claim 4, wherein, when the primary mode beam and the sideband mode beam are provided as non-copropagating beams, the primary mode beam and the sideband mode beam are phase-locked to a local oscillator via actuation of a double-pass acousto-optical modulator.

7. The multi-frequency laser system of claim 6, wherein the double-pass acousto-optical modulator is located in an optical path of the primary mode arm and an optical path of the sideband mode arm upstream of the set of nonlinear optical elements.

8. The multi-frequency laser system of claim 4, wherein a relative difference between the frequency of the primary mode beam and the sideband mode beam is measured downstream of the set of nonlinear optical elements.

9. The multi-frequency laser system of claim 8, further comprising an acousto-optical modulator located upstream of the set of nonlinear optical elements of the primary mode arm and the set of nonlinear optical elements of the sideband mode arm configured to phase lock the primary mode beam and the sideband mode beam based on a measurement of the relative difference.

10. The multi-frequency laser system of claim 1, wherein the relative energy difference between the primary mode beam and the sideband mode beam is determined based on an energy difference between two states of a qubit space defined for a quantum computer comprising the multi-frequency laser system.

11. The multi-frequency laser system of claim 1, wherein, when the primary mode beam and the sideband mode beam are copropagating beams, a relative phase difference between the primary mode beam and the sideband mode beam is stabilized using a radio frequency oscillator.

12. The multi-frequency laser system of claim 1, further comprising a servo system configured to stabilize a relative phase difference and/or a relative frequency difference between the primary mode beam and the sideband mode beam.

13. The multi-frequency laser system of claim 12, wherein the servo system receives as input at least one local oscillator signal and a direct digital synthesizer (DDS) signal.

14. The multi-frequency laser system of claim 13, wherein the DDS signal is provided as part of an input arm of the servo system and provided to an output arm of the servo system.

15. The multi-frequency laser system of claim 14, wherein the DDS signal is provided to the output arm of the servo system via a delay line.

16. The multi-frequency laser system of claim 14, wherein the application of the DDS signal to the output arm of the servo system enables discontinuous phase changes in at least one of the primary mode beam and the sideband mode beam.

17. A servo system coupled to a multi-frequency laser system, the servo system configured to stabilize a relative phase difference and/or a relative frequency difference between a primary mode beam and a sideband mode beam generated by the multi-frequency laser system, the servo system comprising:

an input arm configured to provide an input signal to a servo, the input arm configured to receive a local oscillator signal and a direct digital synthesizer (DDS) signal as input; and an output arm configured to receive an output signal from the servo and a DDS signal.

18. The servo system of claim 17, wherein the DDS signal is provided to the output arm of the servo system via a delay line configured to compensate for a time delay for changes in the DDS signal to propagate through the servo system.

19. The servo system of claim 17, wherein the application of the DDS signal to the output arm of the servo system enables discontinuous phase changes in at least one of the primary mode beam and the sideband mode beam.

20. The servo system of claim 17, wherein the input arm further receives a beat frequency signal corresponding to a relative frequency difference between the primary mode beam and the sideband mode beam.

* * * * *